(12) United States Patent
 Cendrillon et al.

(10) Patent No.: US 8,437,244 B1
(45) Date of Patent: May 7, 2013

(54) CROSSTALK CANCELLER INITIALIZATION

(75) Inventors: Raphael Jean Cendrillon, Kennedy Town (HK); Pak Hei Matthew Leung, Shatin (HK)

(73) Assignee: Marvell International Ltd., Hamilton (BM)

( * ) Notice: Subject to any disclaimer, the term of this patent is extended or adjusted under 35 U.S.C. 154(b) by 1562 days.

(21) Appl. No.: 11/940,805

(22) Filed: Nov. 15, 2007

Related U.S. Application Data

(60) Provisional application No. 60/865,946, filed on Nov. 15, 2006.

(51) Int. Cl.
*H04J 1/12* (2006.01)
*H04J 3/10* (2006.01)

(52) U.S. Cl.
USPC .......................................................... 370/201

(58) Field of Classification Search ................... 370/201
See application file for complete search history.

(56) References Cited

U.S. PATENT DOCUMENTS

| 3,534,172 | A * | 10/1970 | Weeda ................................. 381/4 |
| 7,672,367 | B1 * | 3/2010 | Kimpe et al. .................. 375/225 |
| 2006/0215792 | A1 * | 9/2006 | Murugan et al. ............... 375/343 |
| 2007/0002736 | A1 * | 1/2007 | Gade et al. ...................... 370/230 |
| 2007/0253469 | A1 * | 11/2007 | Kite .................................. 375/148 |
| 2008/0214118 | A1 * | 9/2008 | Ilani et al. ................... 455/67.13 |
| 2008/0310520 | A1 * | 12/2008 | Schenk .......................... 375/257 |

* cited by examiner

Primary Examiner — Alexander Jamal

(57) ABSTRACT

A method for optimizing resource allocation for signal conditioning of DSL or other signal lines includes developing a signal quality metric using crosstalk interference and, optionally, signal to noise level. Use of existing pilot tone training selectively assigned to signal lines allows determination of the signal quality metric. A threshold level is selected and all signal lines having a signal quality metric above the threshold level are assigned crosstalk cancellation resources. Because the total number of signal lines requiring crosstalk cancellation is not known at the beginning, a particular threshold level may result in allocation of more than the available resources or allocation of significantly less than the available resources. When this happens the threshold level may be adjusted and the process repeated until crosstalk cancellation resources are assigned up to a usable limit.

29 Claims, 4 Drawing Sheets

CROSSTALK CANCELLER INITIALIZATION

CROSS-REFERENCE TO RELATED APPLICATION

The present application claims the benefit of U.S. Provisional Application No. 60/865,946, entitled "CROSSTALK CANCELLER INITIALIZATION METHODS," filed on Nov. 15, 2006, which is hereby incorporated by reference herein.

The present application also is related to commonly owned U.S. patent application Ser. No. 11/940,802, entitled "A PER TONE COPROCESSOR ARCHITECTURE," filed on the same day as the present application, and which is hereby incorporated by reference herein in its entirety.

DESCRIPTION OF RELATED ART

Voice and data communication systems, for example, plain old telephone systems (POTS) and digital subscriber line (DSL) systems are subject to crosstalk interference. POTS uses baseband signals for communication between the premise and the central office. DSL has different standards, but in many cases uses a tone-based carrier scheme where data symbols are sent over sub-carriers, or tones, at frequencies above the baseband spectrum reserved for voice.

Crosstalk interference occurs when a signal on one signal line, such as a twisted pair telephone line, is electromagnetically coupled to another signal line. However, in some circumstances, arriving signals can be processed to reduce or eliminate crosstalk interference.

Crosstalk noise cancellation is typically performed at a line interface module that supports a limited number of signal lines. However, the effects of crosstalk interference may reach well beyond the signal lines supported by a single line interface card. So even though crosstalk cancellation is performed by the line interface card, crosstalk interference due to other signal lines on other line interface cards can still negatively affect performance.

Further, crosstalk cancellation processing provided at the line interface card may require each line interface card to be built with the capability to provide crosstalk cancellation processing for a worst case scenario of crosstalk interference. The sum of worst case processing capacity over all line interface cards may result in a dramatic overbuild of processing capability. But for the reasons above, even an excess of overall processing capacity at the line interface card may still not result in effective crosstalk cancellation. This is because interfering signal lines may not be on the same line interface card and therefore cannot be processed.

SUMMARY OF THE DISCLOSURE

To improve overall crosstalk cancellation, a coprocessor may be used to aggregate signal data from a plurality of line interfaces for crosstalk cancellation over a larger selection of signal lines. Because the coprocessor has access to a greater number of signal lines, crosstalk cancellation processing optionally may be sized to an average requirement over a large number of signal lines instead of a worst case environment supporting a number of small sets of signal lines. Also, because the coprocessor has access to a larger span of signal lines, it may be able to assign crosstalk cancellation resources where there are most effective. In at least some embodiments, the overall results for signal quality improvement may exceed that realizable for line interface card-based crosstalk cancellation processing possibly with a lower investment in crosstalk cancellation processing resources.

It may be desirable, however, to assign as much of the coprocessor's crosstalk cancellation resources as possible to provide greater line data rate increases. Measurements of crosstalk interference, signal-to-noise ratio, line data rate, etc., may be used to determine or estimate which pairs of signal lines will likely benefit the most from crosstalk interference cancellation. Each signal line may be assigned a signal quality metric based on the measurements and each signal line having a signal quality metric that crosses some threshold, for example, may be assigned crosstalk cancellation resources. By iteratively adjusting the threshold level, more or fewer signal lines may be included in the group of signal lines receiving crosstalk cancellation processing. The result in some circumstances may be that virtually all of the coprocessor's usable crosstalk cancellation resources are allocated to signal lines.

Several additional considerations in crosstalk interference processing may optionally be accommodated by this process. First, not all signal lines are active at the same time, nor does the activity remain persistent. User signal lines may be activated and deactivated without notice. Use of the threshold level allows marking a selection of signal lines even when all signal lines are not active at the same time. Second, some signal lines may require more processing than others for effective crosstalk cancellation, making it difficult to use a simple linear prediction to match requirements and processing resources. An iterative process may allow uneven distribution of processing resources while still allocating all practically available processing resources. Third, the ultimately stable characteristics of crosstalk interference and cabling in physical plants may allow the final result of an iteration process to remain over long periods. Thus, even if the measurement and set up process is lengthy, its results may last over long periods of time.

DETAILED DESCRIPTION

Figure 1:
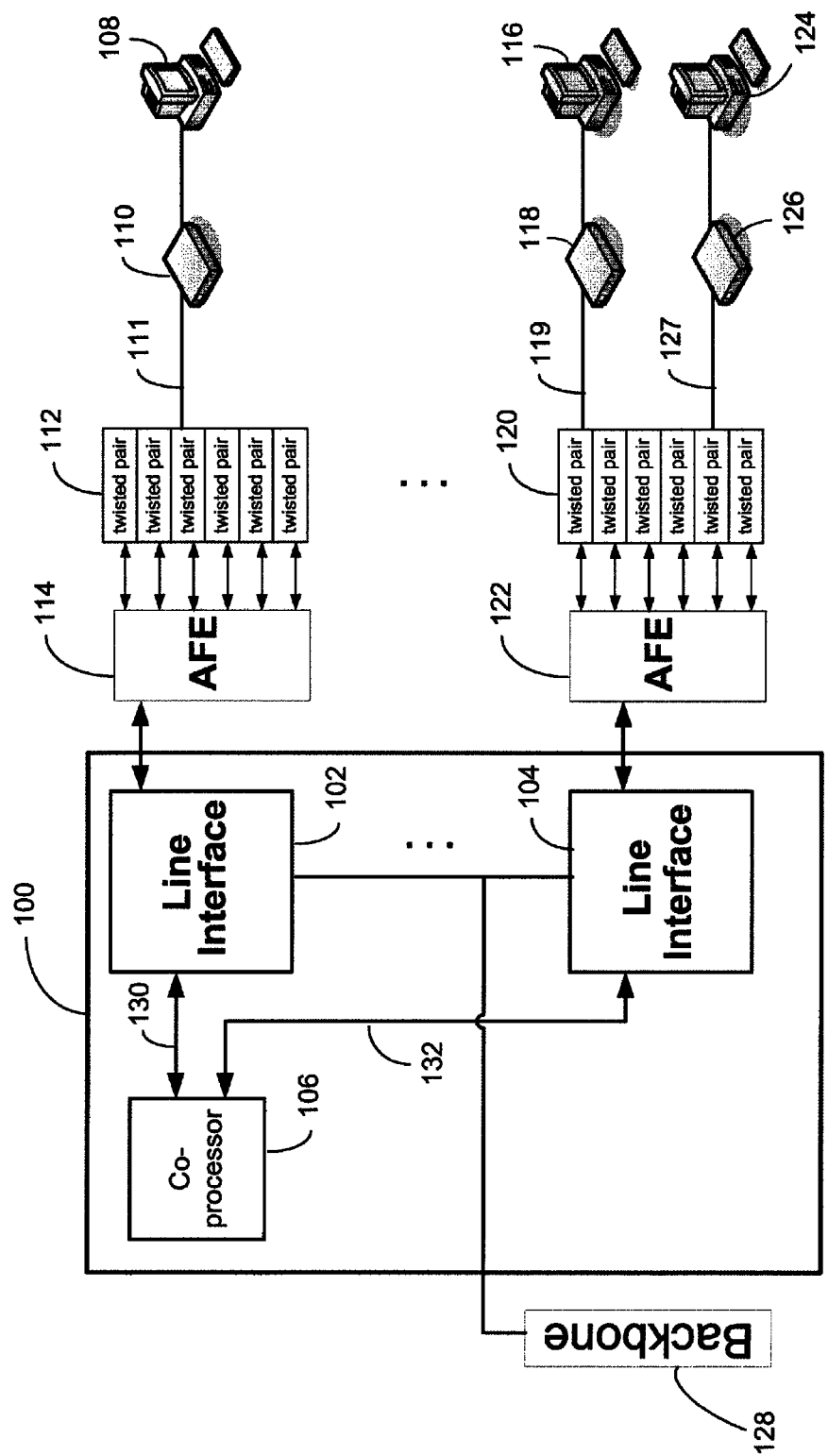
FIG. 1 is a block diagram of a data network.

FIG. 1 is a block diagram of a data network including a signal interface 100. The signal interface 100 includes a plurality if line interfaces represented by line interfaces 102, 104 and a coprocessor 106. The signal interface 100 may be coupled to a plurality of user devices 108, 116, 124 via corresponding modems 110, 118, 126. Signal lines 111, 119, and 127 carrying information to and from the modems 110, 118, 126 may be coupled to twisted pair bundles 112 and 120 and to one or more of analog front ends (AFE) 114 and 122. The signal interface 100 is shown coupled to a backbone network 128 for carrying data traffic to a variety of upstream connections, for example, using a Utopia interface. The user devices 108, 116, 124, twisted pair bundles 112, 120, AFE's 114, 122, and backbone 128 are known in the communications industry. The configuration of the line interfaces 102, 104 and the coprocessor 106 during the setup phase of operation optionally may be accomplished using the methods described in U.S. patent application Ser. No. 11/940,802, cited above.

However, during the setup phase, the functional configuration and operation of functional elements of the line interfaces 102, 104 and coprocessor 106 may be accomplished in other ways as well.

Signals 130, 132 between the coprocessor 106 and line interfaces 102, 104 may include both signal data and control information.

In normal operation, the coprocessor 106 may be used to process signal line transmissions to remove crosstalk interference, both near-end (NEXT) and far-end (FEXT).

In a setup phase of operation, the coprocessor 106 may be used to measure crosstalk interference and noise levels for use in determining to which signal lines 111, 119, 127 processing resources should be applied. Unless specifically indicated, the remainder of Detailed Description discusses to the setup phase of operation.

When signal lines, such as signal lines 111, 119, and 127 are installed, the physical configuration is likely to remain fixed over long periods of time or even for the life of the physical connection, such as a twisted pair copper line. Because crosstalk interference and, to some extent, noise are a function of the physical configuration of signal lines, these characteristics may be generally stable over similarly long periods of time.

Therefore, once interfering lines are identified, the processing requirements for crosstalk interference reduction may also remain generally stable. To select individual signal lines for crosstalk processing, several measurements may be used. Three such exemplary signal quality metrics are discussed below, but other metics may additionally or alternatively be used.

A first example signal quality metric may be a difference in data rate on a signal line, e.g. signal line 111, with and without crosstalk interference. This is a straight forward and effective metric for identifying lines that may benefit from crosstalk interference signal processing. However, in an environment where potentially dozens of line interfaces support hundreds of signal lines, it is may not feasible to remove from service all the signal lines for the purpose of exhaustive crosstalk interference and noise testing under desired conditions.

A second example signal quality metric may utilize a half-normalized noise-to-interference ratio:

$$\frac{1}{SNR} + NIR = \frac{Noise}{Signal} + \frac{Noise}{Interference}$$

Where SNR is signal-to-noise ratio and NIR is noise-to-interference (i.e., crosstalk interference) ratio. When noise is high, the metric will be large, without regard to signal or crosstalk interference. In this case, cancellation of interference may have little effect because noise is the dominate factor. Similarly, if the signal is low, the metric will be high and the application of crosstalk interference cancellation may also have little effect because the low signal level will dominate. Conversely, if noise is low, the signal is high and interference is high, the metric will be low. Cancellation of interference may have a positive effect because the remaining signal may have a strong signal and a good SNR. By selecting lines with a low signal quality metric, cancellation of interference may have the greatest effect.

A third example signal quality metric is a noise-to-interference ratio or noise-to-noise+interference ratio:

$$\frac{Noise}{Interference} \text{ or } \frac{Noise}{Interference + Noise}$$

Again, when noise is high or interference is low, the metric is high and application of crosstalk interference correction may not likely to improve performance.

The first or second example signal quality metrics may be more indicative of whether cross talk cancellation will improve signal quality because they include signal strength component where as the third example metric does not. Without signal strength, the third example signal quality metric could indicate crosstalk interference correction is desirable, when in fact, the signal level may be too low to benefit from crosstalk interference correction.

In the following discussion, a threshold level of signal quality measurements will be referred to and signal lines with signal quality measurements above the threshold level will be marked for crosstalk cancellation processing. While the second and third signal quality metrics above have a low-to-high order for crosstalk processing, one of ordinary skill will realize than these relative signal quality metrics can simply be inverted to give a high-to-low order as described here.

One issue related to crosstalk interference cancellation is finding a method of collecting data for any of the above metrics in light of real world considerations. One such consideration is that signal lines may be activated and deactivated at the whim of a user or other system mechanism beyond the control of the signal interface 100. Also, in an ideal world all the signal lines 111, 119, 127 could be tested in a group, but the fact is that most, if not all, of the signal lines are in beneficial use by subscribers after initial activation. Any testing patterns used should accommodate live data commingled with test patterns.

Another issue related to crosstalk interference cancellation is cost. If cost were not an issue, the coprocessor 106 could be large enough to provide crosstalk interference cancellation services for every line with any measure of crosstalk interference. However, cost or other considerations may constrain the signal interface 100 to apply its resources to a selected set of signal lines for which crosstalk interference cancellation processing provides the most benefit. On the other hand, it may be desirable to include more signal lines when the coprocessor 106 has resources available. So one selection process for signal lines may seek to include as many signal lines as possible giving selection priority to those receiving the most benefit from crosstalk interference cancellation.

The use of a variable threshold level for comparing signal quality metrics may help in selecting signal lines for crosstalk processing in the order of those receiving the most benefit and by continuing to select lines until all usable crosstalk interference processing resources are assigned.

Before such a threshold level can be applied, a signal quality metric for each signal line 111, 119, 127 should first be calculated.

When a new signal line, e.g. signal line 111 is activated, it goes through a training sequence as a matter of course. The crosstalk effect from the new line 111 on other lines 119, 127 can be observed because the training sequence is known. However, the effect of the other lines 119, 127 on the new line 111 may not be as easy to observe because the other lines 119, 127 may, in many circumstances, be carrying user data. The signal line being measured may be called a victim, and the line causing crosstalk interference may be called a disturber.

Most standards for data traffic of the type being discussed, for example, digital subscriber lines (DSL) using discrete multitone (DMT) modulation, define a pilot signal or pilot tone with known signal characteristics. For example, asynchronous DSL using the G.992.1 standard uses one or more pilot tones at sub-carrier 64. The pilot tone or tones may be used for synchronization, among other things. The pilot tone or tones can also be used for signal quality measurement of the current pilot tone sub-carrier.

A least mean square (LMS) estimate can be used, for example:

$$H_{m,n|i+1} = H_{m,n|i} + \mu \cdot \text{err}_{n|i} \cdot X_{m|i}^*$$

with: $\text{err}_{n|i} = Y_{n|i} - H_{m,n|i} X_{m|i}$ where i is the iteration index m is the disturber index n is the victim index n is the frequency domain channel coefficient from transmitter m to receiver n $X_n$ is the frequency domain signal transmitted by transmitter in $Y_n$ is the frequency domain signal received at the receiver n (* denotes the complex conjugate)

The convergence and accuracy of the LMS estimate can be increased by first subtracting the direct signal from the received sequence $Y_n$ before the training algorithm is applied. Thus instead of using $Y_n$ to form the channel estimate, an updated algorithm instead uses $Y_n - \hat{X}_n$, where $\hat{X}_n$ is an estimate of the signal sent by transmitter n and can be estimated using decision feedback or some other technique.

After the characteristics of the channel have been determined, noise, and crosstalk interference information can be calculated. For example, calculation of a noise-to-interference ratio can be calculated using:

$$\frac{\text{Interference}}{\text{Noise}} = \frac{H_{m,n} X_m}{Y_n - H_{m,n} X_m}$$

No changes to existing protocols or standards are required to get this basic information using one or a limited number of pilot tones.

Characterizing a few tones is useful for obtaining limited information such as signal strength or a signal quality metric for a limited number of tones. However, characterization of a few sub-carriers may not be sufficient for determining information needed for crosstalk cancellation for the full channel.

A small change to the applicable standard, such as the G.992.1 standard, allows assignment of a reserved base tone and a pilot tone moveable between channels. Both the line interfaces 102, 104 and the modems 110, 118, 126 should agree on a set of pilot tones and a sequence order for pilot tone movement.

The base tone may be used for initial pilot tone testing. After the base tone sub-carrier has been characterized, the user data on the next sub-carrier in the sequence may be moved to the base tone. With the user data moved, the pilot tone may be reassigned to the next sub-carrier. The pilot tone may then be used to characterize the next sub-carrier. After the measurements are complete, the user data may be returned to the next sub-carrier. This process may be repeated until each sub-carrier has had its data moved to the base tone to be replaced with the known information of the pilot tone. When each sub-carrier has been tested, the full channel characteristics are known.

Because each tone with user data will be moved to the base channel, the base channel should be selected to accommodate the highest data rate present on the full channel.

In one embodiment, the pilot tones may be different for each line 111, 119, 127. In another embodiment, the implementation may be simplified if the lines 111, 119, 127 use the same pilot tones at the same instant in time. By rotating the pilot tones in a synchronized manner and transmitting orthogonal training sequences on each line, a simple correlation can be used to estimate the channel co-efficients instead of having to do a full matrix inversion. The use of an orthogonal training sequence that only contains elements with a value of one or minus one is used, for example, a Walsh-Hadamard sequence, allows the correlation operation to be implemented with additions and subtractions only. This eliminates the need for a matrix multiplication, significantly reducing the complexity of signal quality metric calculation and the associated computing resources.

To enable such measurements and signal line selection, the coprocessor 106 and the custom line interfaces 102, 104 may include hardware or software structures as described below with respect to FIG. 2 and FIG. 3.

Figure 2:
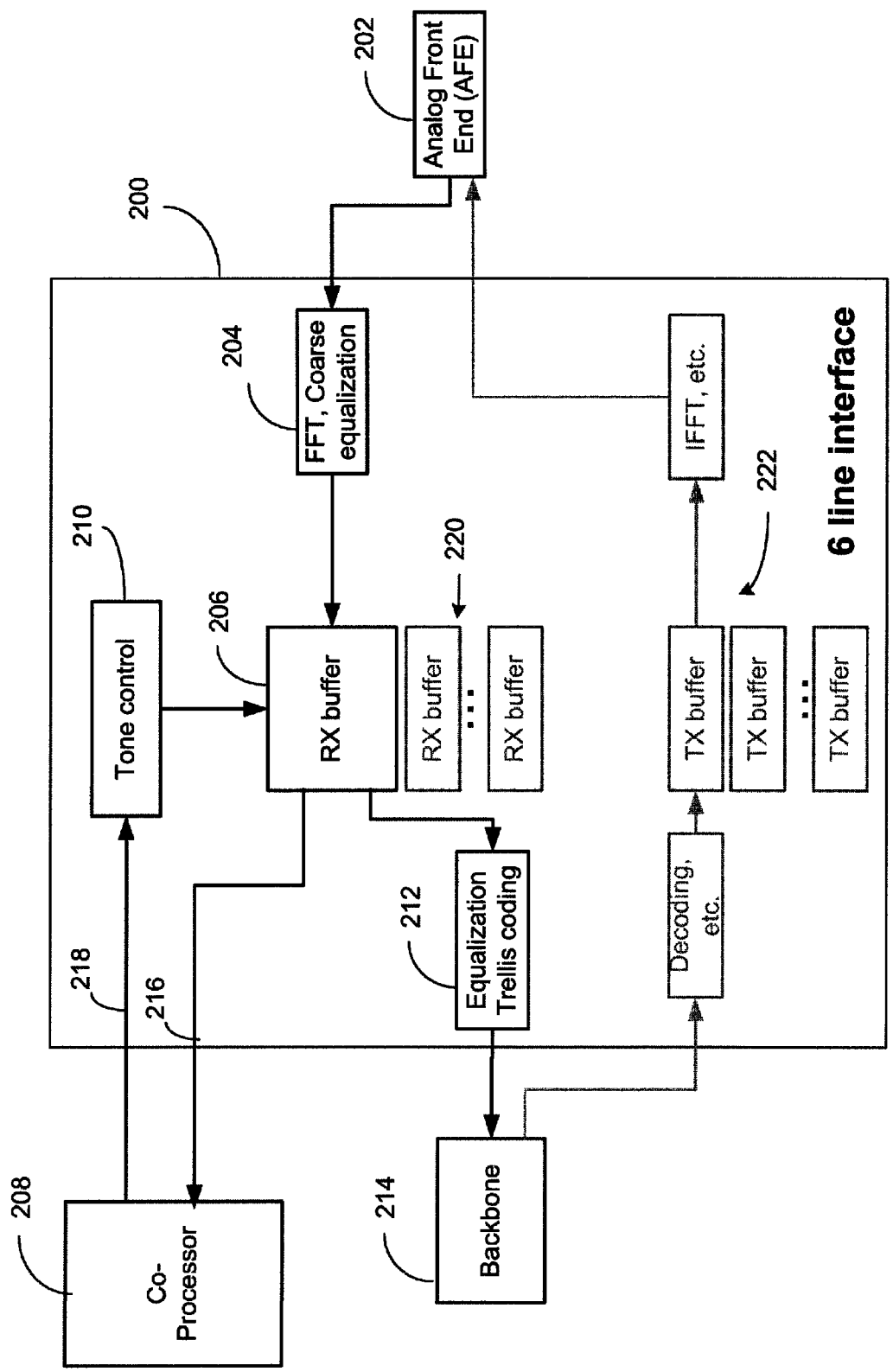
FIG. 2 is a block diagram of a signal line interface illustrating a receive data path.

FIG. 2 is a block diagram of a line interface 200. The line interface 200 may support a number of individual twisted-pair signal lines (not depicted) coupled through an analog front end 202. Signals received via the analog front end 202 may be passed to an input block 204 that may perform an initial signal equalization and de-modulation using a fast Fourier transform (FFT). In other embodiments, the input block 204 may perform variations of these or other tasks. The demodulated signal may be stored in a receive buffer 206. A coprocessor 208, may receive a copy of the input signal for noise and crosstalk interference analysis over connection 216. When the coprocessor 208 is not being used for crosstalk interference cancellation, for example, when it is being used for signal quality measurements, the receive buffer 206 may also supply the input signal to an output block 212 for further equalization and coding, such as Trellis coding, before being output to the backbone 214. The backbone 214 may support data traffic using a Utopia protocol interface, known in the art.

The coprocessor 208 may also send information to a tone control block 210 over connection 218. Tone control is discussed in more detail below, but in general, tone control is used to manage placement of pilot tone test signals on selected tones, or sub-carriers for test purposes. In normal operation, the tone control block 210 may also be used to select which signal lines are directed to the coprocessor 208 for crosstalk interference cancellation.

Figure 3:
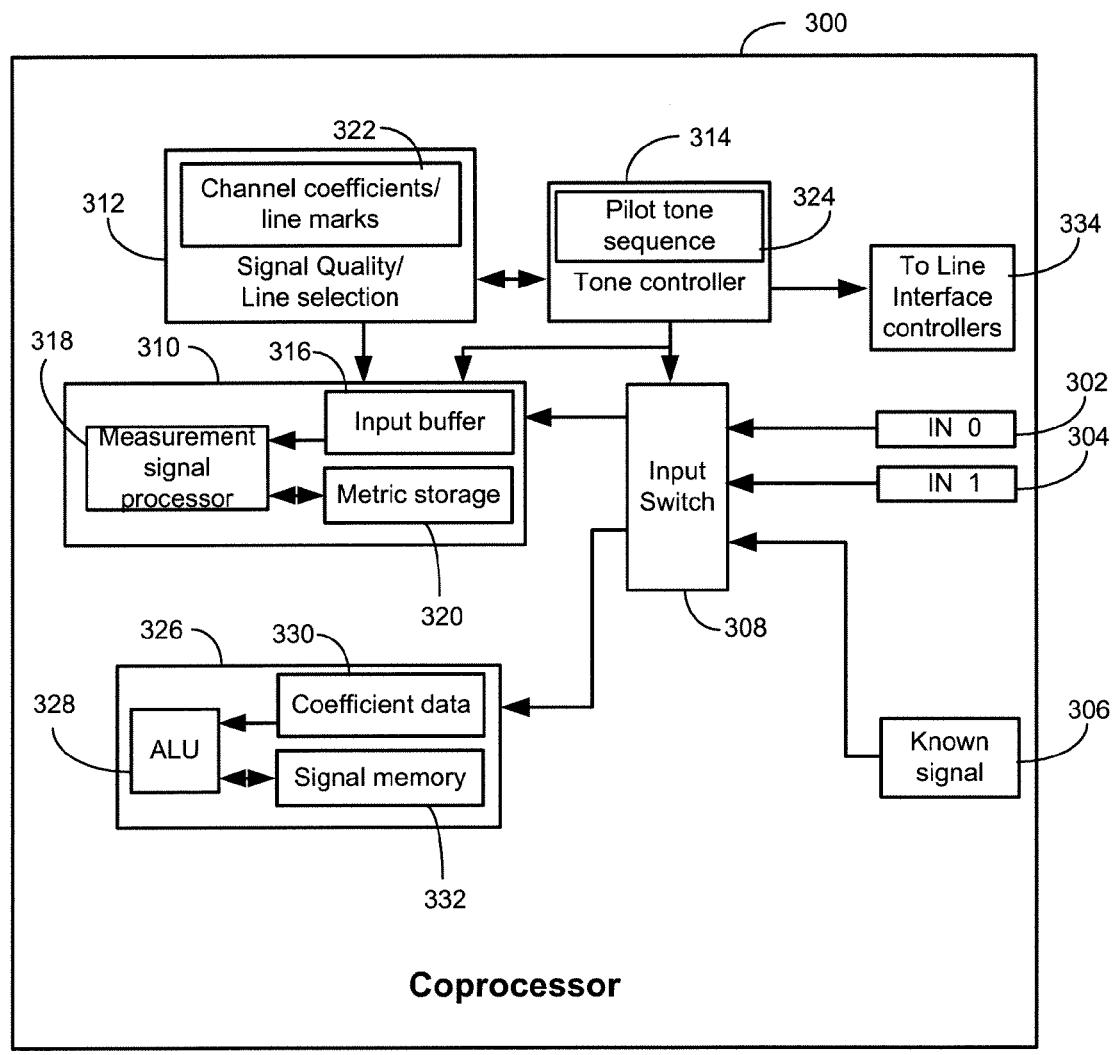
FIG. 3 is a block diagram of a signal coprocessor.

FIG. 3 is a block diagram of a coprocessor 300, such as the coprocessor 106 of FIG. 1 and the coprocessor 208 of FIG. 2. FIG. 3 depicts one possible configuration of the coprocessor 300 for use in determining signal quality metrics and for selecting signal lines to which to apply crosstalk interference cancellation.

A first input 302 and a second input 304 may be coupled to line interfaces 102, 104 respectively. When more line interfaces are present, more inputs may be configured. A known signal input 306 may optionally be used to present a noise-free signal for use in noise and crosstalk measurements.

An input switch 308 may direct data on any of the inputs 302, 304, 306 to a measurement circuit 310. The measurement circuit 310 may include an input buffer 316, a measurement signal processor 318 for determining a signal quality metric, and a signal metric storage buffer 320. As mentioned above, the use of an orthogonal training sequence using, for example, the Walsh-Hadamard sequence, allows the ALU 318 to use only simple math functions, such as add, subtract, multiply, etc.

The input switch 308 may also be able to direct data on any of the inputs to a crosstalk cancellation circuit 326. The crosstalk cancellation circuit 326 may include an arithmetic unit (ALU) 328, coefficient data 330 that may also include executable instructions for the ALU 328 and signal memory 332 for storing signal data both before and after crosstalk cancellation. In some embodiments, the crosstalk cancellation circuit 326 may be one of a series of such circuits (not depicted).

The crosstalk cancellation circuit 326 may have a fixed limit on the amount of crosstalk cancellation processing that it is able to provide. For example, the ALU 328 may process data in discrete time slots. Different signals may require one or more discrete time slots to effectively address crosstalk interference. Therefore, when allocating crosstalk cancellation resources, it may not be enough to simply select a particular signal line, but also to select how many time slots to dedicate to the particular signal line. Subsequent selections should take into account what crosstalk cancellation resources remain at the crosstalk cancellation circuit 326.

Activities of the measurement circuit 310 may be managed by a line selection block 312 in conjunction with a tone controller 314. The line selection block 312 is used for allocating the crosstalk interference cancellation resources of the crosstalk cancellation circuit 326. The line selection block 312 may be a single chip processor, controller, or other known mechanism for performing logic activities. The line marks block 322 provides a means for setting the threshold level used for selecting lines and may include channel coefficients, that is, coupling information, as well as indicators of what signal lines 111, 119, 127 are currently marked for crosstalk noise cancellation processing. The tone controller 314 may include a sequence memory 324 used to coordinate movement of pilot tone through a known sequence of sub-carriers, or tones, used to transmit data on the signal lines 111, 119, 127. The tone controller 314 may coordinate movement of pilot tones for each participating line interface 102, 104 via a line interface output 334 when line testing is in progress.

Figure 4:
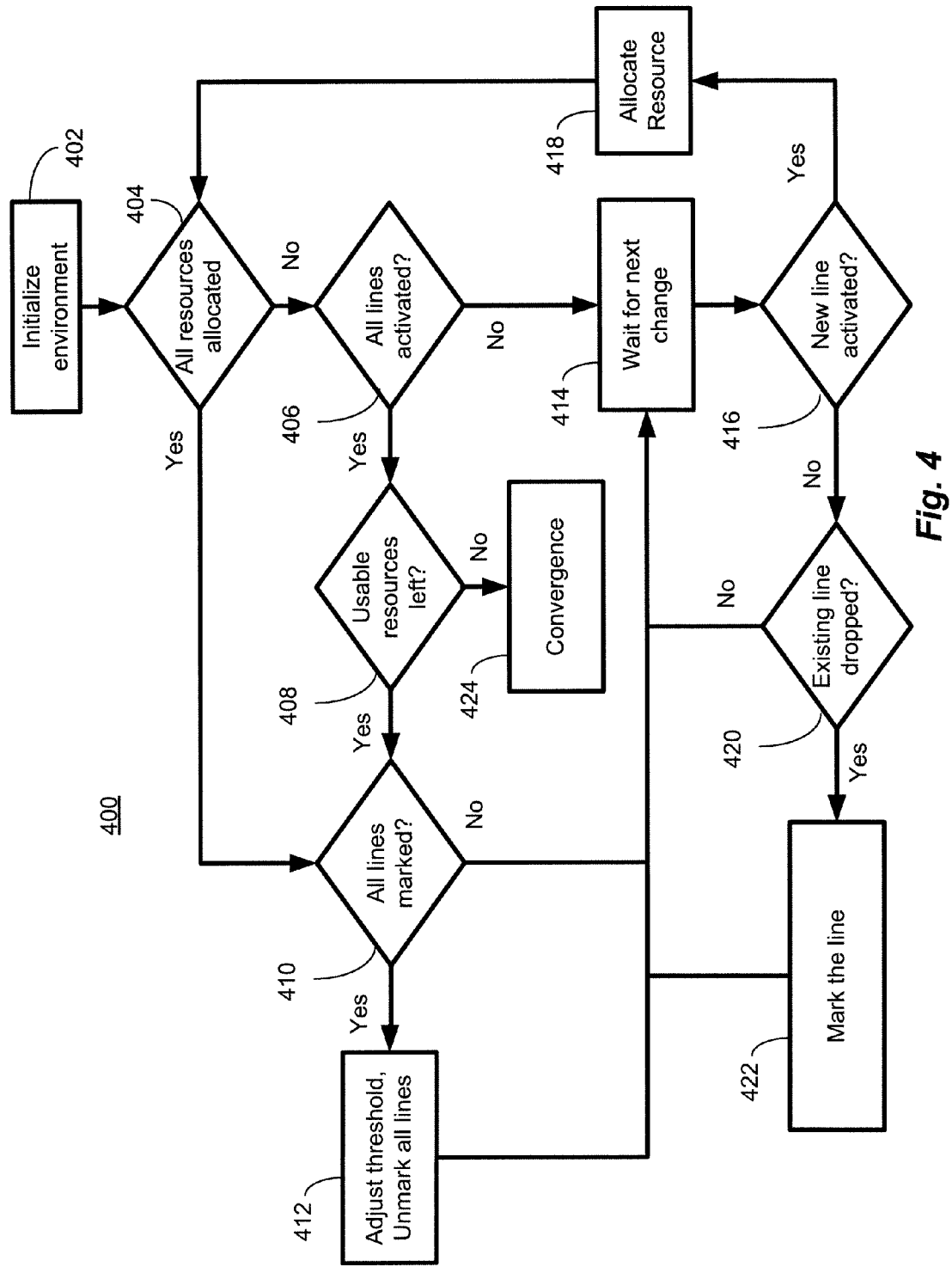
FIG. 4 is a method of using a threshold signal quality level for selecting signal lines and assigning crosstalk cancellation processing resources to the selected signal lines.

FIG. 4 is a flow diagram of an embodiment of a method 400 of using a threshold level of signal quality for selecting signal lines and assigning crosstalk cancellation processing resources to the selected signal lines. At block 402, an initialization process may be executed. The initialization process may include selecting an initial threshold value, marking all the lines for crosstalk interference cancellation processing and allocating an interference cancellation resource to a first signal line that is activated, e.g. line 111 of FIG. 1. Allocating the interference cancellation resource to the first signal line 111 may include assigning a processing time slot for an interference canceling resource, e.g. crosstalk cancellation circuit 326 of FIG. 3. If the signal quality metric for the first signal line 111 is significantly above the threshold level, more than one processing time slot may be assigned to the first signal line 111.

At block 404, a check may be made if all resources have been allocated. Since this is the first time through the loop, the 'no' branch may be followed to block 406. When, at block 404, all resources have been allocated, the 'yes' branch from block 404 may be followed to block 410.

At block 406, a check may be made to determine if all lines are activated. If not, execution may follow the 'no' branch to block 414.

At block 414, a wait state may be entered while waiting for a change of state, that is, activation of a dormant line or deactivation of an active line. When a change is detected at block 414, processing may continue at block 416.

At block 416, when a new line has been activated, the 'yes' branch may be followed to block 418. At block 418, a crosstalk cancellation resource may be allocated to the newly activated signal line, for example, signal line 119, if the signal quality metric is above the threshold. After allocating the crosstalk cancellation resource, if required, execution may continue at block 404.

If, at block 416, the change is not a new line activation, processing may continue at block 420. At block 420, if an existing line is deactived, the line may be marked by following the 'yes' branch from block 420 to block 422. At block 422, any lines not previously adjusted based on a new threshold may be marked. If, at block 420, the change detected is not a line being deactivated, the 'no' branch may be followed to block 414.

For the purpose of illustration, we assume execution follows the loop through 414, 416, 418 one or more times and execution continues at block 404. If all resources are allocated, the 'yes' branch is followed to block 410. At block 410, a determination is made whether all lines are marked. If not, the 'no' branch is followed to block 414.

Returning again to block 404, if all crosstalk interference cancellation resources have not been assigned, the 'no' branch may be followed to block 406. If all lines have been activated at block 406, the 'yes' branch may be followed to block 408.

At block 408, if usable crosstalk cancellation resources are left, for example, enough processing time slots are available to add another line, the 'yes' branch may be followed to block 410. If at block 410, all lines are marked, the 'yes' branch may be followed to block 412.

Block 412 may be reached via two paths, block 404 to block 410, or block 404 to blocks 406, 408, and 410. If the former path is taken, all lines have been marked, and all resources have been committed. That implies that one or more lines may have been assigned crosstalk interference cancellation resources that may not be accessible. In other words, crosstalk interference cancellation resources are possibly over-committed. If so, the threshold level may be adjusted to reduce the number of lines for which crosstalk cancellation resources will be assigned. The latter path to reaching block 412, through block 406, etc., implies that even though all lines have been marked, there are usable resources that have not been assigned. In other words, the crosstalk interference cancellation resources are under-committed and some signal lines may benefit from additional processing. When resources are under-committed, the threshold level may be adjusted to increase the number of lines to which crosstalk interference resources are committed.

In either case, at block 412, the threshold level is adjusted, each line is unmarked and processing continues at block 414. Adjustments to the threshold level may include adjusting the threshold level by a fixed amount. For example, a 10% adjustment either up or down may be made depending upon the need to add or reduce signal lines. Alternatively, the adjustment may be a percentage based on a ratio of the number of line markers for selected lines vs. a total number of lines in the set of lines. In yet another embodiment, a comparison of allocated resources to total available resources may be used to determine how to change the threshold level, especially when the threshold level is to be increased to include more lines. When the adjustment is to reduce signal lines, the allocated resources will be equal to, or nearly equal to the total available resources, and may not be as useful as other techniques for determining a new threshold level. Other ways of adjusting the threshold also may be utilized.

After processing continues in this fashion over a period of time, processing may again reach block 404. When the execution path goes to block 404 and then to block 408, at block 404 a determination of useable resources remaining will be made, as in previous passes through that loop. If no usable resources remain, the implication is that all lines have been activated, crosstalk interference cancellation resources have been assigned and that there are not enough remaining resources to add another line. For example, one processing time slot in a crosstalk cancellation circuit 326 may be left but the next tone below the threshold level requires two processing time slots. A target range of useable resources may be designated. For example, a range of unallocated resources within 10% of the time slots remaining at any crosstalk cancellation circuit 326. In another embodiment, the target range may be fewer total unallocated time slots than the total of number of cancellation circuits when more than one cancellation circuit is present.

In this case, the 'no' branch from block 408 may be taken to block 424. At block 424, convergence is reached. As mentioned above, because changes in crosstalk occur very slowly, if at all, once convergence is reached, no more attempts at optimization may be required. For example, even if a line is deactivated and corresponding crosstalk cancellation resources become temporarily available, reconfiguring the entire system to track such a transient change of unpredictable duration may not be.

The example system and method described above provide an initialization process for assigning crosstalk interference cancellation that automatically optimizes signal processing resources. The adjustable threshold level iteratively reaches a convergent state that applies all usable crosstalk cancellation resources to the signal lines that most benefit from such processing. Additionally, a companion technique for measuring a signal quality metric for each line is compatible with existing systems, using existing pilot tones and moving them through all channels.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

We claim:

1. A method of determining a selection of lines to which to apply crosstalk cancellation, the method comprising:
   determining a metric corresponding to crosstalk interference for each line of a set of lines;
   setting a threshold level for the metric;
   allocating a respective resource to each line meeting the threshold level, the respective resources configured to cancel crosstalk interference in the lines meeting the threshold;
   determining total resources allocated to all lines meeting the threshold level;
   determining if the total resources are within a target range; and
   if the total of resources is not within the target range, resetting the threshold level and repeating the act of allocating until the total resources allocated is within the target range,
   wherein resetting the threshold level includes
       setting a new threshold level by changing the threshold level corresponding to one of a fixed amount and a percentage,
       clearing a line marker for each of the set of lines,
       monitoring each line for a change in status, and
       setting a corresponding line marker on each line meeting the new threshold level upon a change in status.

2. The method of claim 1, wherein resetting the threshold level comprises:
   resetting the threshold level so that resources are allocated to less lines if the total resources allocated exceed the target range.

3. The method of claim 1, wherein resetting the threshold level comprises resetting the threshold level based on a ratio of line markers for selected lines versus a total number of lines in the set of lines.

4. The method of claim 1, wherein resetting the threshold level comprises:
   resetting the threshold level so that resources are allocated to more lines if the total resources allocated are below the target range.

5. The method of claim 4, wherein
   the line marker indicates selection for application of crosstalk cancellation.

6. The method of claim 1, wherein resetting the threshold level comprises resetting the threshold level based on a ratio of allocated resources to total available resources.

7. The method of claim 1, wherein determining the metric comprises:
   measuring a signal quality on a first line by comparing a received signal to a known sent signal; and
   calculating noise and interference metrics from the signal quality.

8. The method of claim 7, wherein calculating noise and interference metrics comprises:
   calculating the noise metric as $Y_n - H_{m,n} X_m$ and the interference metric as $H_{m,n} X_m$ where $Y_n$ is a frequency domain signal received at a receiver n, $H_{m,n}$ is a frequency domain channel coefficient from a transmitter m to the receiver n, and $X_m$ is a frequency domain signal transmitted by the transmitter m.

9. The method of claim 1, wherein determining the metric comprises:
calculating a change in data rate for a line by subtracting a first data rate with a crosstalk interference present from an other data rate with the crosstalk interference removed.

10. The method of claim 1, wherein determining the metric comprises:
identifying a first line upon activation;
monitoring a training sequence signal level on the first line after activation of the first line; and
measuring a noise level on each of the other lines induced by the training sequence signal coupled from the first line.

11. The method of claim 1, wherein determining the metric comprises:
identifying a first line upon activation;
monitoring a pilot signal from an other line in the set of lines to determine crosstalk interference from the other line to the first line.

12. The method of claim 11, further comprising:
determining a set of parameters for crosstalk cancellation between the first line and the other line wherein determining the set of parameters comprises:
moving the pilot signal through each tone in a channel;
measuring the crosstalk interference on the first line caused by the pilot signal on the other line for each tone; and
calculating coefficient for use in crosstalk cancellation for each tone.

13. The method of claim 12, wherein moving the pilot signal through each tone in the channel comprises:
allocating a base tone for carrying a signal normally assigned to a tone currently being used for the pilot signal.

14. The method of claim 13, further comprising:
allocating a plurality of base tones and measuring crosstalk interference imposed on the first line using more than one pilot signal on separate tones.

15. A controller used in a communication system where signal lines are subject to crosstalk interference between signal lines, the controller having a computer-readable medium storing computer-executable instructions for implementing a method comprising:
measuring crosstalk interference on each signal line;
determining a signal quality metric based on crosstalk interference and signal-to-noise level on each signal line, wherein determining the signal quality metric comprises calculating the signal quality metric as $$\frac{noise}{signal} + \frac{noise}{interference};$$

setting a threshold level for the signal quality metric;
marking for crosstalk interference processing each signal line for which a corresponding signal quality metric exceeds the threshold level;
assigning a resource for crosstalk interference processing to each marked signal line, the resource for cancelling crosstalk interference in the marked signal line;
determining if the total assigned resources is within a target range of assigned resources; and
if the total resources is not within the target range of assigned resources, resetting the threshold level for the signal quality metric and repeating the acts of marking and assigning until the total assigned resources is within the target range of assigned resources.

16. The controller of claim 15, wherein assigning the resource for crosstalk interference processing comprises assigning the resource in blocks of processing time.

17. The controller of claim 15, wherein when the total assigned resources is above the target range, resetting the threshold level comprises adjusting the threshold level so that when the act of marking is repeated a smaller number of signal lines will be marked.

18. The controller of claim 15, wherein when the total assigned resources is below the target range, resetting the threshold level comprises adjusting the threshold level so that when the act of marking is repeated a larger number of signal lines will be marked.

19. A method of determining a selection of lines to which to apply crosstalk cancellation, the method comprising:
determining a metric corresponding to crosstalk interference for each line of a set of lines, wherein determining the metric includes
measuring a signal quality on a first line by comparing a received signal to a known sent signal, and
calculating noise and interference metrics from the signal quality, wherein calculating noise and interference metrics includes calculating the noise metric as $Y_n - H_{m,n}X_m$ and the interference metric as $H_{m,n}X_m$ where $Y_n$ is a frequency domain signal received at a receiver n, $H_{m,n}$ is a frequency domain channel coefficient from a transmitter m to the receiver n, and $X_m$ is a frequency domain signal transmitted by the transmitter m;
setting a threshold level for the metric;
allocating a respective resource to each line meeting the threshold level, the respective resources configured to cancel crosstalk interference in the lines meeting the threshold;
determining total resources allocated to all lines meeting the threshold level;
determining if the total resources are within a target range; and
if the total of resources is not within the target range, resetting the threshold level and repeating the act of allocating until the total resources allocated is within the target range.

20. The method of claim 19, wherein resetting the threshold level comprises:
resetting the threshold level so that resources are allocated to less lines if the total resources allocated exceed the target range.

21. The method of claim 19, wherein resetting the threshold level comprises resetting the threshold level based on a ratio of line markers for selected lines versus a total number of lines in the set of lines.

22. The method of claim 19, wherein resetting the threshold level comprises:
setting a new threshold level by changing the threshold level corresponding to one of a fixed amount and a percentage;
clearing a line marker for each of the set of lines;
monitoring each line for a change in status; and
setting a corresponding line marker on each line meeting the new threshold level upon a change in status.

23. The method of claim 19, wherein resetting the threshold level comprises:
resetting the threshold level so that resources are allocated to more lines if the total resources allocated are below the target range.

24. The method of claim 23, wherein resetting the threshold level comprises:
setting a new threshold level by changing the threshold level corresponding to one of a fixed amount and a percentage;
clearing a line marker for each of the set of lines, the line marker indicating selection for application of crosstalk cancellation;
monitoring each line for a change in status; and
setting a corresponding line marker on each line meeting the new threshold level upon a change in status.

25. The method of claim 19, wherein resetting the threshold level comprises resetting the threshold level based on a ratio of allocated resources to total available resources.

26. A controller used in a communication system where signal lines are subject to crosstalk interference between signal lines, the controller having a computer-readable medium storing computer-executable instructions for implementing a method comprising:
measuring crosstalk interference on each signal line;
determining a signal quality metric based on crosstalk interference and signal-to-noise level on each signal line, wherein determining the signal quality metric comprises calculating the signal quality metric as $$\frac{noise}{interference + noise};$$

setting a threshold level for the signal quality metric;
marking for crosstalk interference processing each signal line for which a corresponding signal quality metric exceeds the threshold level;
assigning a resource for crosstalk interference processing to each marked signal line, the resource for cancelling crosstalk interference in the marked signal line;
determining if the total assigned resources is within a target range of assigned resources; and
if the total resources is not within the target range of assigned resources, resetting the threshold level for the signal quality metric and repeating the acts of marking and assigning until the total assigned resources is within the target range of assigned resources.

27. The controller of claim 26, wherein assigning the resource for crosstalk interference processing comprises assigning the resource in blocks of processing time.

28. The controller of claim 26, wherein when the total assigned resources is above the target range, resetting the threshold level comprises adjusting the threshold level so that when the act of marking is repeated a smaller number of signal lines will be marked.

29. The controller of claim 26, wherein when the total assigned resources is below the target range, resetting the threshold level comprises adjusting the threshold level so that when the act of marking is repeated a larger number of signal lines will be marked.

* * * * *